Nov. 16, 1965  J. E. GARDNER  3,218,622
GROUND FAULT DETECTOR
Filed Dec. 3, 1962
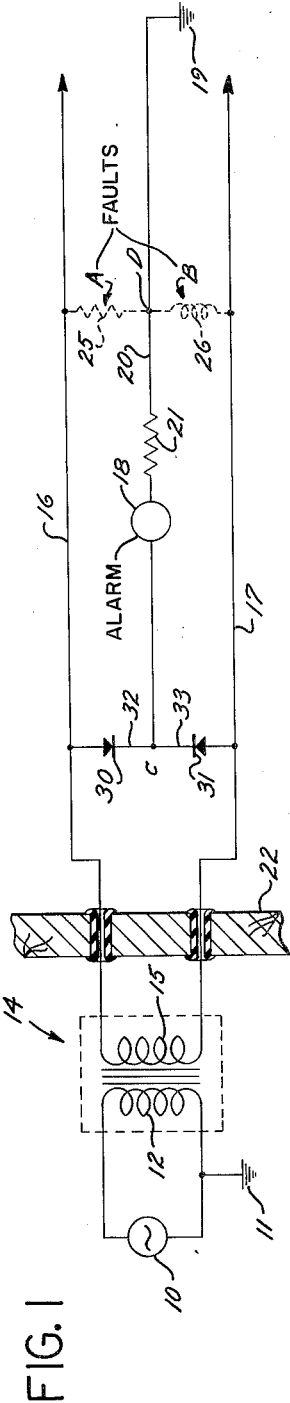
FIG. I
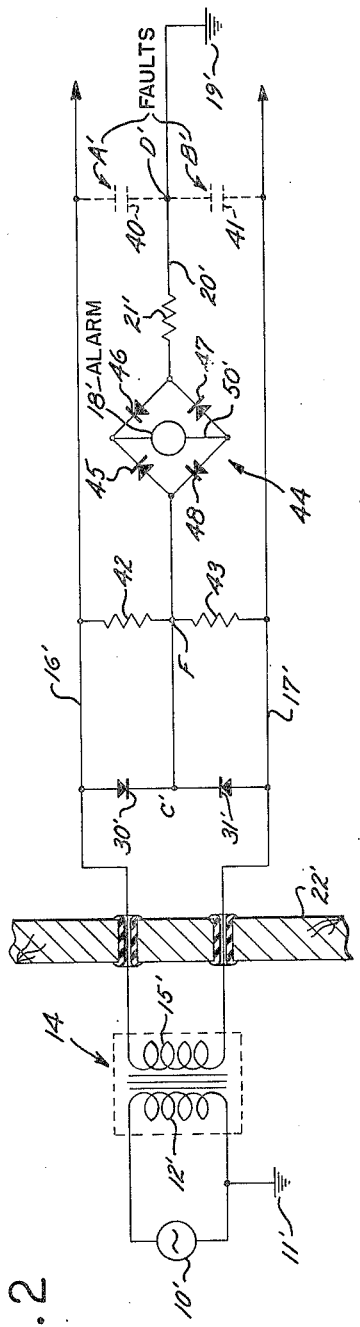
FIG. 2
*INVENTOR.*
JACK E. GARDNER
BY
*R. E. Geauque*
ATTORNEY

United States Patent Office 3,218,622
Patented Nov. 16, 1965

3,218,622
GROUND FAULT DETECTOR
Jack E. Gardner, Anaheim, Calif., assignor to The Birtcher Corporation, Los Angeles, Calif., a corporation of California
Filed Dec. 3, 1962, Ser. No. 241,578
1 Claim. (Cl. 340—255)

This invention relates to a ground fault detector and more particularly to a fault monitoring apparatus for use with an isolated ungrounded electrical power system, said monitoring apparatus providing an alarm in the event the current carrying conductors of the isolated system accidentally contact a grounded object through a fault in the isolated electrical system or through a faulty piece of equipment connected to the system.

In anesthetizing locations, an ungrounded electrical distribution system is required to reduce the hazards of electric shocks and arcs in the event of insulation failure. The distribution system is insulated from the conventionally grounded alternating current supply by means of one or more transformers which isolate the distribution circuits of the system electrically from the main feeder and from other circuits in the building. The ungrounded system is provided with a ground fault detector in the form of a ground-contact indicator so arranged that a green signal lamp, conspicuously visible to persons in the anethetizing location, remains lighted while the system is isolated from ground. An adjacent red signal lamp and an audible warning signal is energized when any conductor of the system becomes grounded through a resistance of any value from zero to 100,000 ohms, and the current through such a connection or fault to ground exceeds 2 milliamperes.

Ground fault detection systems presently in use have the disadvantage that equal defects or faults, such as the same resistance or impedance, between each of the two conductors of the isolated distribution supply and ground, will cause the alarm to become inoperative. Thus, the inability of present monitoring systems to alarm, if equal or near equal faults exist in the isolated ungrounded distribution system, is present regardless of the magnitude of these equal faults. Any isolated power distribution system will have some leakage defects as no system is perfect but if the alarm does not operate when a defect of predetermined magnitude is sensed by the monitoring device, it is not accomplishing its purpose. Thus, current through equal faults should be additive in the alarm circuit and not cancel out as in present devices.

Present ground fault detection systems utilize two resistors of equal resistance value which are connected in series between the two lines of the ungrounded system so that an electrical center exists between the two resistors. The alarm is connected between this electrical center and a system ground. The system ground is connected to the conduit, all exposed metal parts of electrically powered apparatus and any other exposed conductors which may become energized through a fault. The system ground may or may not be connected to an earth ground. The system ground offers no return path for current flow. Thus, no current will flow through the alarm in the absence of a fault between either line and ground. When a fault occurs between one of the lines and the alarm circuit, current can flow through the fault to the electrical center of the system located at a point midway between the series connected resistors and then current will flow to the line offering the greatest potential difference which is the other line. However, if equal faults existed between each line of the system, the two faults also have an electrical center, the same as exists between the two series connected resistors, and the two electrical centers would be of equal potential and no current would flow between them so that no current would flow through the fault detecting relay coil of the alarm located therebetween.

The present invention proposes to replace the two series connected resistors with two rectifiers so that there is no longer an electrical center in the monitored system. One rectifier has a polarity reversed with respect to the other so that current would flow through one rectifier during positive half cycles only and through the other rectifier during negative half cycles only. Thus, the current flowing through one fault is in no way affected by the current flowing through the other fault and therefore equal faults between opposite lines and the alarm circuit do not cancel out as in prior devices.

This form of the invention is fully effective for faults which are resistive or inductive in nature. However, a modified form of the invention is utilized when capacitive type faults are encountered. In this modification, leak or bleeder resistors are connected between the alarm and each of the lines and the alarm is inserted in a full-wave bridge rectifier so that current will always flow in the same direction through the alarm. The leak resistances permit the capacitive faults to charge and discharge on alternate half cycles and current flow through the alarm would reverse in the absence of the bridge rectifier which causes all currents to flow through the relay coil of the alarm in the same direction, thus allowing all currents to add up.

It is therefore an object of the present invention to provide a ground fault detector in which current flowing through faults in two lines of an ungrounded distribution system will always be additive in the alarm relay coil of the detector.

Another object of the invention is to provide two rectifiers of opposite polarity connected in series between the conductors of the ungrounded system so that positive half cycle current will flow through one fault located between one conductor and the alarm, and negative half cycle current will flow through another fault located between the other conductor and the alarm.

A further object of the invention is to provide a ground fault detector having rectifiers of opposite polarity connected in series between the conductors of an ungrounded system and having leak resistors connected between the alarm and the conductors so that capacitive faults between either conductor and the alarm can charge and discharge a fault to operate the alarm.

These, and other objects of the invention not specifically set forth above, will become readily apparent from the accompanying description and drawings in which:

FIGURE 1 is a schematic circuit for the first form of the invention showing the transformer which connects the isolated ungrounded electrical system to the conventionally grounded alternating current supply;

FIGURE 2 is a circuit schematic similar to FIGURE 1 showing a second form of the invention which incorporates leak resistances connected between the lines and a full-wave bridge rectifier.

Referring to FIGURE 1, a conventionally grounded alternating current supply 10 is shown having a ground 11 and connected to the primary winding 12 of transformer 14. An isolated secondary winding 15 of the transformer connects with conductors or lines 16, 17 of the ungrounded electrical distribution system. The ungrounded conductors 16, 17 are protected by ground fault detector alarm 18 against being grounded through a fault which would permit a current flow in excess of a predetermined amount. The alarm 18, located in line 20, can include a relay coil which is connected to ground 19 through a current limiting resistor 21 also located in line 20. The relay actuates the alarm when the current flow through the coil exceeds the preselected amount. The ungrounded electrical distribution system, comprising lines 16 and 17, would be suitable for an anesthetizing location behind wall 22 where it is required to reduce the hazard of electrical shocks and arcs in the event of insulation failure or other faults. In such use, the relay for the alarm 18 would be operable if the current exceeds 2 milliamperes designated as the maximum allowable. Normally, the conductors 16, 17 would carry 115 volt cycle A.C.

Referring again to FIGURE 1, fault A is connected between conductor 16 and line 20 and is shown as a resistance 25. Also, fault B is connected between conductor 17 and line 20 and is shown as an inductance. Either fault A or B can be resistive or inductive in nature and both can be either inductive or resistive without affecting the operation of the circuitry. Two rectifiers 30 and 31 of reverse polarities are connected by lines 32 and 33, respectively, to the point C to which line 20 is also connected. The ground 19 is effectively connected to the isolated distribution system from the secondary winding 15 only at neutral point C and therefore offers no return path for current flow in the absence of a fault.

In operation of the detector, if only fault A is present, rectified current would flow through the fault, the current limiting resistor 21 and the alarm 18 to the point C. From point C, the current would flow on alternate half cycles through rectifier 31 to the conductor 17. In a similar manner, current flowing through fault B will flow through the current limiter 21, the alarm 18 and the rectifier 30 to conductor 16 on alternate half cycles. Current flow through the rectifier 30 would be during positive half cycles only and current flow through rectifier 31 would be during negative half cycles only. It is therefore apparent that the current flow in fault A would in no way be affected by current flow through fault B, because each rectifier can conduct only on alternate half cycles.

Because of this polarity arrangement of the rectifiers, positive and negative half cycles will flow in the same direction from point D located between the faults, to point C, and the two currents would therefore add or reinforce each other in the relay coil of alarm 18. If the faults A and B were equal, then equal currents would flow and the currents would add in the alarm device. If only one fault existed, then only one half the current would flow through the alarm device. In any case, if a predetermined current is exceeded in the relay, it would operate an alarm. Any current that would flow from conductor 16 through faults A and B to conductor 17 would have no advantageous or adverse effect on the alarm, and current cannot flow from conductor 16 to conductor 17 through the rectifier because of their reverse polarities. It is also apparent that the polarity of the rectifiers as shown in FIGURE 1 could both be reversed without affecting the operation of the device.

As previously discussed, prior devices have used two series connected resistors in place of the rectifiers 30 and 31. It is apparent that if faults A and B are equal, they would form an electrical center at point D, the same as would exist at the point C between the two resistors of prior devices. Since there would be no potential difference between points C and D of such prior devices, no current would flow between them and no current would flow through the fault detecting alarm. Thus, it has been possible with prior devices to have undetected faults existing in the ungrounded system which would give no alarm indication. The embodiment shown in FIGURE 1 is primarily intended for the large majority of ungrounded systems in which capacitive faults can be ignored.

Referring to FIGURE 2, in which prime numbers designate similar parts as in FIGURE 1, this modification is capable of indicating not only inductive and resistive faults, but also faults that are capacitive in nature. Both faults A' and B' are illustrated as capacitors 40 and 41, respectively, which are connected to line 20' at the point D'. As in the prior modification, two rectifiers 30' and 31' are connected in series across the conductors 16' and 17' and the line 20' is connected to ground 19' and contains the current limiting resistor 21'. However, in FIGURE 2, resistors 42 and 43 are connected in series across conductors 16 and 17 and connect to line 20' at point F. Also, a full-wave bridge rectifier 44 is contained in line 20' for connecting the alarm 18' into the fault circuit. The full-wave rectifier consists of diodes 45, 46, 47, and 48 which have their polarities so arranged that current will always flow downwardly in FIGURE 2 through line 50 and alarm 18'.

The addition of the leak resistors 42 and 43 and the full-wave bridge rectifier 44 to the circuit of FIGURE 1 is required to operate the alarm 18' with the capacitive faults in the circuit. For instance, if the fault A in FIGURE 1 were a capacitor, current would flow through fault A until the charge on the capacitor equaled the line voltage, at which time the current would cease to flow. The alarm relay is not a latching type and even though it should close and alarm while this charging current is flowing, it would reopen after the capacitor had charged within a matter of one second at most. Thus, even though the capacitive fault exists, the alarm protection device would indicate no fault. The same condition would exist if only fault B were capacitive or if both faults A and B were capacitive in nature. The addition of the resistors 42 and 43 to the circuit of FIGURE 2 provides for discharging the capacitors. In other words, the negative half cycle through the rectifier 31' will charge the capacitor A' and the resistor 42 will discharge it during the next positive half cycle. This alternating current will flow through the alarm relay as well as through the fault. In order to make the positive and negative currents flow in the same direction through the alarm relay and therefore be additive instead of cancelling, the alarm 18' is located in full-wave bridge rectifier 44. Upon charging of either capacitor, current flow will be through rectifiers 46 and 48 and upon discharging of either capacitor, current flow will be through rectifiers 45 and 47. Thus, the bridge rectifier 44 will cause all current to flow through the relay coil of alarm 18' in the same direction, making all currents additive.

It is understood, of course, that the faults A' and B' in FIGURE 2 could be resistive or inductive as well as capacitive and still produce additive current in the alarm 18' so that equal faults on opposite sides of the lines cannot cancel out and prevent operation of the alarm. When the faults A' and B' are resistive or inductive, negligible current flow will take place through resistors 42 and 43, since the path of least resistance will be through either diode 30' or 31' and current would always be unidirectional through the faults even though the full-wave bridge bridge rectifier were eliminated.

By the present invention there is provided a ground fault detector which is operative with various types of faults which are to be guarded against and in all forms of the invention, the current flowing through the relay coil of the alarm is additive. With respect to the capacitive faults, 0.01 microfarad capacitance is as large as will normally be encountered because of capacitance between coil windings in various types of equipment of typical construction. However, the form of the invention of FIGURE 2 is operative with considerably higher capacitances, typically at least up to 0.1 microfarad capacitance faults, before the current flow through the alarm is no longer an exact numerical summation, even though the currents are still additive. Various other modifications are contemplated by those skilled in the art without departing from the spirit of the invention as hereinafter defined by the appended claim.

What is claimed is:

Ground fault detector apparatus for indicating a circuit path between ground and an ungrounded electrical distribution system, comprising:

an isolation transformer;

a pair of ungrounded conductors connected to the secondary of said transformer and adapted for supplying alternating current to said distribution system;

a pair of rectifiers connected in series across said conductors and having polarities such that current can flow through said rectifiers toward a common junction between said rectifiers;

a pair of leak resistors shunt connected across respective ones of said rectifiers;

a curent limiting resistor having one terminal connected to said ground;

a full-wave rectifier bridge having its input connected between said common junction and the other terminal of said resistor; and alarm means connected across the output of said rectifier bridge so that current will always flow in the same direction through said alarm means, to indicate the existence of a circuit path from said ground to either one or both of said conductors.

References Cited by the Examiner

UNITED STATES PATENTS

| | | | |
|---|---|---|---|
| 2,022,758 | 12/1935 | Corderman | 340—255 |
| 2,079,636 | 5/1937 | Sharp | 317—18 |
| 2,428,563 | 10/1947 | Fountain | 340—255 |
| 2,660,717 | 11/1953 | Hood | 340—255 |

FOREIGN PATENTS 289,538   4/1928   Great Britain.

NEIL C. READ, *Primary Examiner.*